United States Patent
Ruan et al.

(10) Patent No.: US 10,296,254 B2
(45) Date of Patent: May 21, 2019

(54) METHOD AND DEVICE FOR SYNCHRONIZATION IN THE CLOUD STORAGE SYSTEM

(71) Applicant: Tsinghua University, Beijing (CN)

(72) Inventors: Mingkang Ruan, Yangjiang (CN); Zhenhua Li, Beijing (CN); Yunhao Liu, Beijing (CN)

(73) Assignee: Tsinghua University, Beijing (CN)

( * ) Notice: Subject to any disclaimer, the term of this patent is extended or adjusted under 35 U.S.C. 154(b) by 79 days.

(21) Appl. No.: 15/610,441

(22) Filed: May 31, 2017

(65) Prior Publication Data

US 2018/0285015 A1    Oct. 4, 2018

(30) Foreign Application Priority Data

Mar. 28, 2017    (CN) .......................... 2017 1 0195750

(51) Int. Cl.
    *G06F 3/06*        (2006.01)
    *G06F 16/178*      (2019.01)
    *G06F 16/13*       (2019.01)

(52) U.S. Cl.
CPC .......... *G06F 3/0643* (2013.01); *G06F 3/0604* (2013.01); *G06F 3/067* (2013.01); *G06F 16/137* (2019.01); *G06F 16/178* (2019.01)

(58) Field of Classification Search
CPC ......... G06F 17/30174; G06F 17/30097; G06F 17/30109; G06F 17/30203; G06F 17/3033; G06F 17/30345; G06F 17/30575; G06F 3/0604; G06F 3/0643; G06F 3/067

See application file for complete search history.

(56) References Cited

U.S. PATENT DOCUMENTS

| | | | |
|---|---|---|---|
| 2013/0054727 A1* | 2/2013 | Kumano | ............. H04L 67/1097 709/212 |
| 2016/0110377 A1* | 4/2016 | Yun | .................... G06F 17/30174 713/165 |
| 2016/0342342 A1* | 11/2016 | Kan | ...................... G06F 12/0802 |
| 2017/0208052 A1* | 7/2017 | Jai | .......................... H04L 63/08 |

* cited by examiner

*Primary Examiner* — Zhuo H Li

(74) *Attorney, Agent, or Firm* — Umberg Zipser LLP

(57) ABSTRACT

The present disclosure is to provide a synchronization method and device for a cloud storage system. The method includes receiving an operation request for a file object initiated by a client; calculating a hash value corresponding to the file object according to the operation request; acquiring the partition which the file object is stored according to the hash value; acquiring corresponding storage devices of each copy of the file object according to the partition which the file object is stored; initiating a write request to the storage devices to store the copies of the file object to the corresponding storage devices; and calculating a new hash value of the partition and transmitting the new hash value to an adjacent storage device. With the synchronization method and device of the present disclosure, it may reduce the network overhead and the synchronization delay.

6 Claims, 15 Drawing Sheets

| COPY | PARTITION 1 | PARTITION 2 | ... | PARTITION 262144 |
|---|---|---|---|---|
| 1 | DEVICE 1 | DEVICE 2 | ... | DEVICE 262144 |
| 2 | DEVICE 4 | DEVICE 3 | ... | DEVICE 1 |
| 3 | DEVICE 7 | DEVICE 10 | ... | DEVICE 123 |

FIG.5

METHOD AND DEVICE FOR SYNCHRONIZATION IN THE CLOUD STORAGE SYSTEM

CROSS REFERENCE

This application claims the benefit of Chinese Patent Application No. 201710195750.2, filed on Mar. 28, 2017, which is hereby incorporated by reference for all purposes as if fully set forth herein.

BACKGROUND

Technical Field

The present disclosure is related to the field of cloud storage, and more particularly to a synchronization method and device for a cloud storage system.

Related Art

Cloud storage services provide users with a mechanism to access files on the network at any time. With the explosive growth of the amount of Internet data, efficient, reliable and stable storage of these data becomes very urgent. Therefore, cloud storage has become a hot spot in the field of network storage.

The object storage system using the eventual consistency model is a cloud storage system having the advantages Network Attached Storage (NAS) and Storage Area Network (SAN), with high-speed direct access of the SAN and data sharing of NAS. Such system has high reliability and may provide cross-platform architecture and secure data sharing storage. Object storage systems are an important component for building cloud computing systems. However, the existing object storage systems have tremendous bandwidth consumption and problems with high latency issues that need to be solved. In addition, huge amounts of money are needed to purchase routers and switches, and so on to complete the construction of the network infrastructure.

On the other hand, the existing object storage system requires longer time to achieve a consistent state of file synchronization. Thus, for large-scale systems, the system consumes a large amount of computing resources to copy the file objects in the respective storage nodes to other storage nodes. This will lead to a delay in the execution of the client instruction, which can lead to a poor user experience. Similarly, for data-intensive object storage systems, data synchronization often has a significant delay, and a large number of network overhead becomes unacceptable.

SUMMARY

The present disclosure is to provide a synchronization method and device for a cloud storage system, applicable for a cloud storage system with multiple copies of data.

One embodiment of the disclosure provides a synchronization method for a cloud storage system. The method includes receiving an operation request for a file object initiated by a client; calculating a hash value corresponding to the file object according to the operation request; acquiring the partition which the file object is stored according to the hash value; acquiring corresponding storage devices of each copy of the file object according to the partition which the file object is stored; initiating a write request to the storage devices to store the copies of the file object to the corresponding storage devices; and calculating a new hash value of the partition and transmitting the new hash value to an adjacent storage device.

Another embodiment of the disclosure provides a synchronization device for a cloud storage system. The device includes a first calculation module, a write-in module and a second calculation module. In response to an operation request for a file object initiated by a client, the first calculation module calculates a hash value corresponding to the file object according to the operation request and acquires the partition which the file object is stored according to the calculated hash value. The write-in module determines storage devices of each copy of the file object according to the partition which the file object is stored, and initiating a write request to the determined storage devices to store the copies of the file object to the corresponding storage devices. The second calculation module calculates a new hash value of the partition and transmitting the new hash value to an adjacent storage device.

Another embodiment of the disclosure provides a synchronization device for a cloud storage system. The device includes one or more processors and a memory. One or more modules are stored in the processor. When the one or more modules are executed by the one or more processors, the one or more modules executes the steps of: receiving an operation request for a file object initiated by a client; calculating a hash value corresponding to the file object according to the operation request; acquiring the partition which the file object is stored according to the hash value; acquiring corresponding storage devices of each copy of the file object according to the partition which the file object is stored; initiating a write request to the storage devices to store the copies of the file object to the corresponding storage devices; and calculating a new hash value of the partition and transmitting the new hash value to an adjacent storage device.

The synchronization device and method of the disclosure may can reduce the cost for building the network infrastructure. Further, the may synchronization device and method also reduce the network overhead and the synchronization delay.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which:

FIG. 5 is the distributed hash table used in the disclosure;

DETAILED DESCRIPTION

Figure 1:
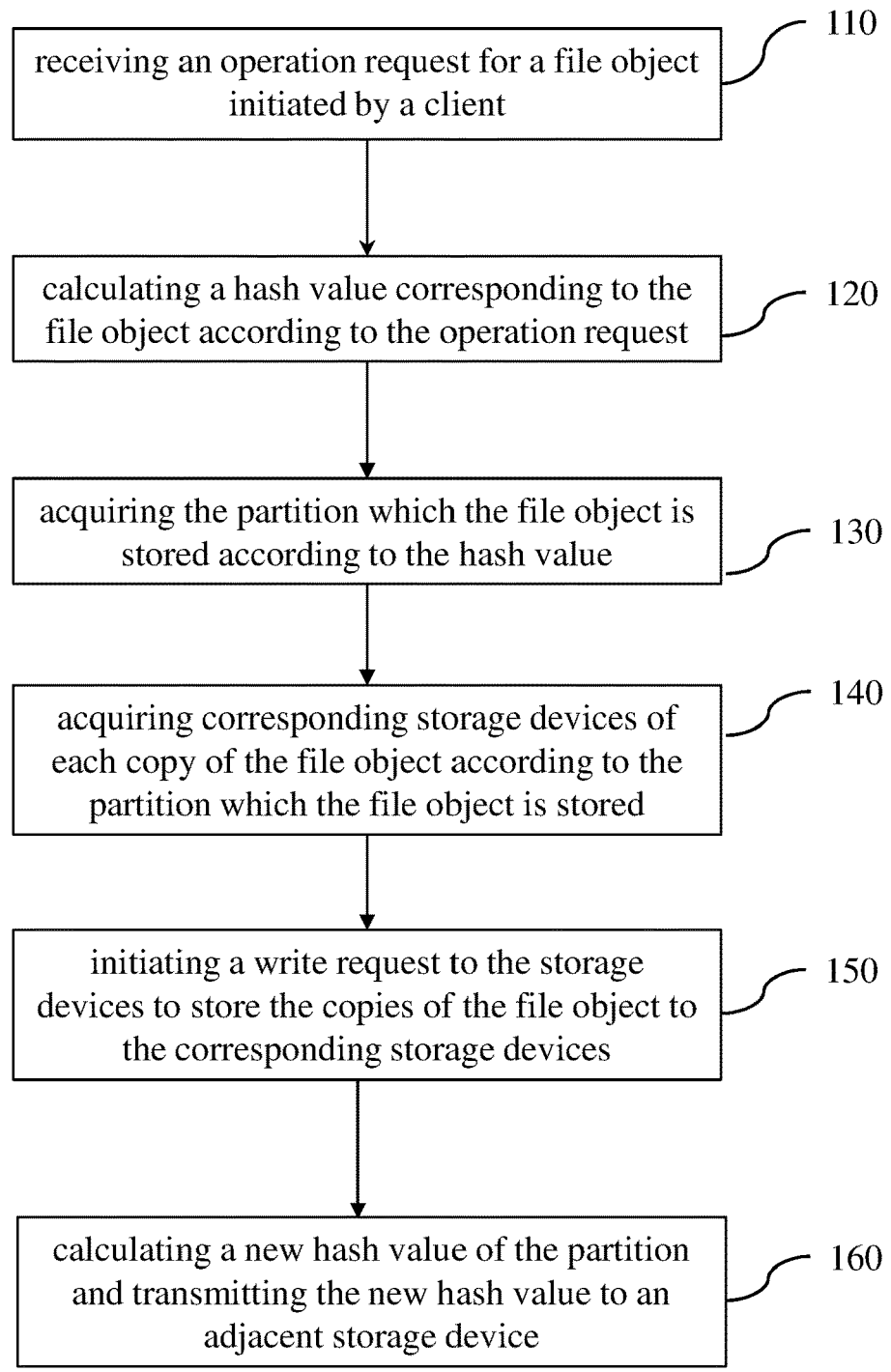
FIG. 1 is a flow chart of the synchronization method for a cloud storage system of the disclosure.

The following description with reference to the accompanying drawings is provided to explain the exemplary embodiments of the present disclosure. Note that in the case of no conflict, the embodiments of the present disclosure and the features of the embodiments may be arbitrarily combined with each other.

In addition, the steps of the method of the embodiment of the disclosure shown in the drawings may be performed in a computer system such as a set of computer-executable instructions. Moreover, while the method of the embodiment of the present disclosure embodies a certain logical sequence of execution of the technical solution of the present disclosure in the illustrated flowchart, it is generally said that the logical sequence is limited to the logical sequence shown in the flow chart. In other embodiments of the present disclosure, the logical sequence of the technical solution of the present disclosure may also be implemented in a manner different from that shown in the drawings.

It is to be noted that the execution body of the embodiments of the present disclosure may be integrated in the server or may exist independently, and the present disclosure includes but is not limited thereto. Certainly, besides the embodiments of the present disclosure exist independently, the embodiments of the present disclosure may be used in combination with each other. Combination the embodiments of the present disclosure may be also possible to implement the technical solution of the embodiment of the present disclosure.

The embodiments of the present invention will be described in detail below with reference to the accompanying drawings.

FIG. 1 illustrates the flow chart of the synchronization method for a cloud storage system of the disclosure. In FIG. 1, the method includes the following steps:

Step 110: receiving an operation request for a file object initiated by a client;

Step 120: calculating a hash value corresponding to the file object according to the operation request;

Step 130: acquiring the partition which the file object is stored according to the hash value;

Step 140: acquiring corresponding storage devices of each copy of the file object according to the partition which the file object is stored;

Step 150: initiating a write request to the storage devices to store the copies of the file object to the corresponding storage devices;

Step 160: calculating a new hash value of the partition and transmitting the new hash value to an adjacent storage device.

Figure 2:
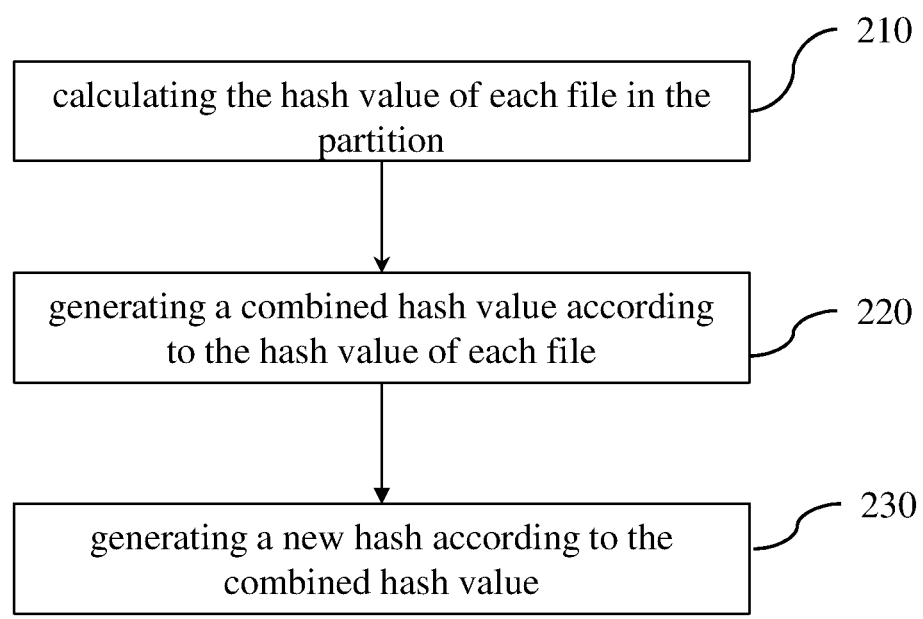
FIG. 2 is a flow chart of the synchronization method for a cloud storage system of the disclosure, illustrating the detailed flow for calculating a hash value of a new partition in Step 160 of FIG. 1.

FIG. 2 is a flow chart of the synchronization method for a cloud storage system of the disclosure, illustrating the detailed flow for calculating a hash value of a new partition in Step 160 of FIG. 1. The method includes the following steps:

Step 210: calculating the hash value of each file in the partition;

Step 220: generating a combined hash value according to the hash value of each file;

Step 230: generating a new hash according to the combined hash value.

The method of FIGS. 1 and 2 will be described in detail as below. Openstack Swift is used as an example. Openstack Swift is an open source object storage system that has been widely used in industry and academia.

Figure 3A:
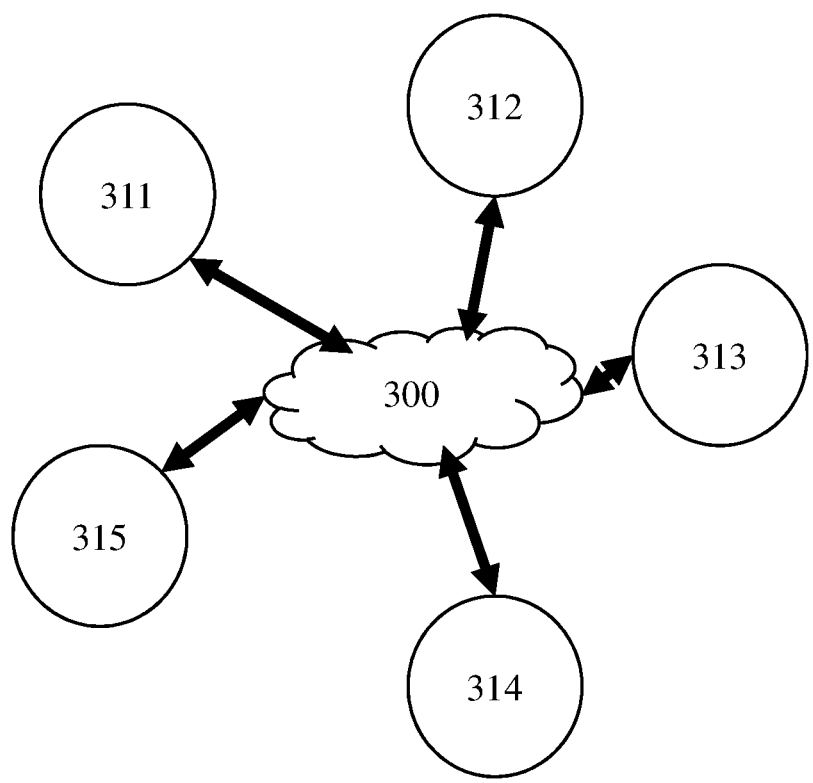
FIG. 3A is a schematic physical configuration diagram of the cloud storage device of the disclosure.
Figure 3B:
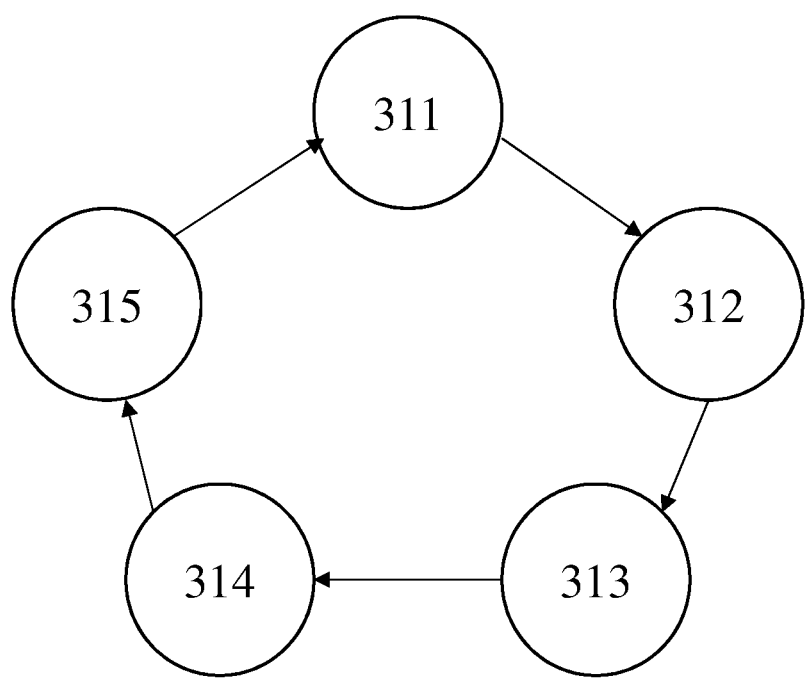
FIG. 3B is a schematic physical configuration diagram of the cloud storage device of the disclosure and the schematic global data flow.

In the disclosure, the storage nodes are connected by a network system 300 composed of routers or switches, configured as a star network as shown in FIG. 3A. FIG. 3A shows the actual physical configuration. The arrows in the figure represent the network connection. The ring structure in the present disclosure means that the flow of the network data is logically circular, as shown in FIG. 3B. In the prior art, when the system needs synchronization, each storage node is required to transmit the data and the information that requires synchronization to other storage nodes. For example, the storage node 311 transmits the data and the information that requires synchronization to the storage node 312, 313, 314, and 315. This will cause the burden to the system. According to the method of the disclosure, the storage node 311, 312, 313, 314, and 315 logically synchronize in a circular manner such that the flow of network data is circular. By way of circular synchronization, each storage node merely needs to exchange data with the next adjacent storage node. Therefore, the network load of the storage system and computation can be greatly reduced.

The specific process is described below. The main aspect of the present disclosure is to synchronize by way of circular synchronization.

Figure 3C:
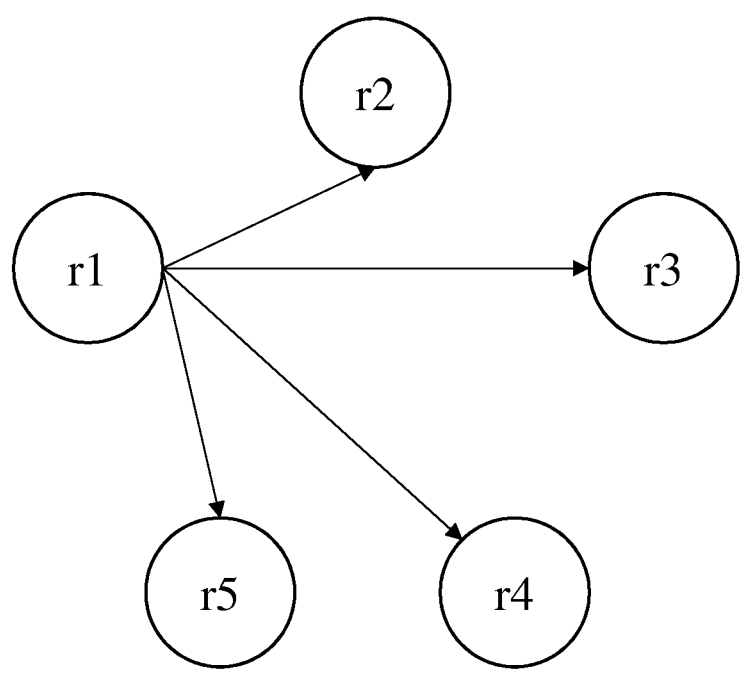
FIG. 3C is the schematic data flow of a single node and the schematic physical configuration diagram when the cloud storage device of the prior art is synchronizing data.
Figure 3D:
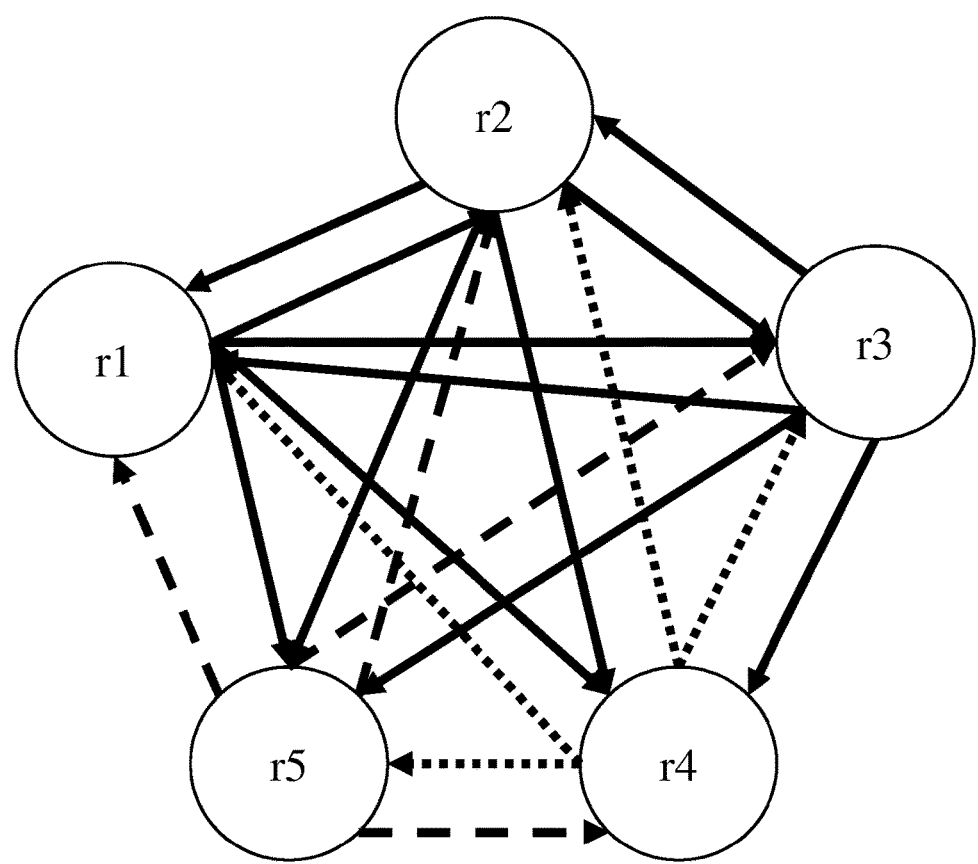
FIG. 3D illustrates the process of data exchanges for all of the storage devices in the system.

In the object storage system of the prior art, when a certain storage node (device) requires to synchronize data with a certain partition, it needs to go through the following process. FIG. 3C illustrates the logical relationship of data synchronization in the prior art, in which all nodes require to request data from all the other nodes. Taking the device r1 as an example for illustrating the process of pushing data to the other nodes. FIG. 3D illustrates the process of data exchanges for all of the five nodes, in which each node transmits data to the other four nodes. The device r1 is taken as an example to illustrate the process of synchronizing data in a certain partition, in which the number of copies r of the system is 5.

The synchronization includes the following steps:
(1) acquiring the storage device of each copy corresponding to the file in a certain partition;
(2) simultaneously sending a synchronization request to all of the remote storage devices (r2, r3, r4, r5) and compared the returned hash values;

(3) if there is inconsistence between the content in the partition in a certain (or more) node and the content in the partition of the local node, transmitting the file in the partition of the local node to the node that has different version of file;

(4) if there is inconsistence, the remote node (for example r2) would discover an updated version of file in the partition when the remote node subsequently access the partition and then delete the other versions of file.

Each node would go through the process as mentioned above. That is to say, for each partition, each node is required to synchronize with the (r−1) devices having the copies of the file. Therefore, the logical relationship of the storage nodes in the system for the synchronization is illustrated in FIG. 3D.

In the present disclosure, the synchronization for a single file object in the cloud storage system is modified as shown in FIG. 3B such that each storage node merely needs to synchronize data with the next node rather than all nodes. It is presumed that r copies are stored in the system for each file object. By way of the conventional synchronization method, it needs r*(r−1) times of synchronization for each file object in the system. The method of the disclosure merely requires r times of synchronization, which is 1/(r−1) of the original synchronization. Correspondingly, the network overhead and the time required for synchronization would decline significantly.

Next, the synchronization flow of the present disclosure will be described in detail. The client initiates an operation request for a file object to a proxy server. The proxy server may be one of the storage node 311, 312, 313, 314, 315. The proxy server receives the operation request for the file object initiated by the client (step 110). Then the proxy server calculates a hash value corresponding to the file object according to the operation request (step 120) and acquires corresponding storage devices of each copy of the file object according to the partition which the file object is stored (step 130).

The step of acquires corresponding storage devices of each copy of the file object according to the partition which the file object is stored (step 130) would be illustrated in detail as below. In a distributed object storage system, an object may be determined according to an account in association with the object, the container of the account and the name of the file object in the container. For example, /rmk/container1/obj.txt represents an object named "obj.txt" in the container named "container1" under the "rmk" account. The hash value of "/rmk/container1/obj.txt" would be generated first, then the first n bits of the hash value is taken as the number of the partition. In the example of n=18, the first 18 bits of the hash value is the partition of the file object. Therefore, when the system select n=18, the first 18 bits of the hash value of the file object is taken as the partition of the file object in the step 130 after the hash value of the file object is calculated in the step 120.

MD5 and SHA-1 algorithm are the typical hash algorithms. This disclosure uses MD5 (Message-Digest Algorithm 5) algorithm. A 128-bit hash value may be obtained from data with any length, and may be used for a distinction characteristics from other data. If every 4 bit is represented by a hexadecimal character, then a string with 32-bit may be represented.

The operation request mentioned in step 110 include four scenarios, including creation, deletion, node failure, and steady state. That is, the synchronization method disclosed in this disclosure can be applied to these four scenarios.

In the scenario of creation, the file object is uploaded to the cloud storage system. If the file object is uploaded at a higher frequency in a short time, the time required for the data of all nodes to reach a consistent state becomes quite long due to the frequent updating of the data. This scenario usually occurs in large-scale cloud storage systems.

In the scenario of deletion, the file object is modified or deleted. Most of the object storage system, in dealing with file modification request, is to delete the file object and then re-create a new file. As a result, old copies in all storage devices are deleted first and then new data is transferred and written into each storage device. So, in this scenario, the consumption of network resources may be more than other scenarios.

In the scenario of node failure, one or more storage devices or nodes may not be in the aforementioned ring structure, so that any instructions or operations cannot be processed for the time being. The original copy of these failed nodes will become obsolete after the operation is resumed or re-connected to the system. In the prior art, the system will have a program called Rsync to handle these outdated replicas to synchronize the replicas to the latest state. The method of this disclosure does not require modification of the Rsync program, and may also achieve a faster and more efficient state of consistency.

In the scenario of steady state, the entire cloud storage system will be in a stable state. For a period of time there is no data operation or data read, that is, the creation, deletion and data access instructions will be suspended for some time.

After the step 130, the proxy server then finds a storage device corresponding to each copy of the plurality of file objects (step 140). In this embodiment, the corresponding storage device may be acquired by the distributed hash table in the step 140. That is, the corresponding storage device may be acquired according to the correspondence between the partition, the copy, and the storage device recorded by the ring data structure.

Specifically, in the distributed object storage system, the storage location of the object is based on the distributed hash table (DHT) data structure. DHT creates a space with a $2^n$ partition. In a typical application, n generally takes 18, which is a total of 262144 partitions. Through the ring data structure, Swift records the storage devices corresponding to the 262144 partitions, as shown in FIG. 5. The storage device in which each backup (replica) of each partition is stored is recorded by this table. Therefore, the location of each backup may be determined by calculating the partition in which the object is stored.

For example, the partition of the obj.txt file is 1, and the system has three backups. The three backups are stored in the device 1, 4, and 7, respectively. The three devices are connected together to form a ring. Since this correspondence table is the same in each node, it is easy for a node to determine its respective upstream and downstream node.

After acquiring corresponding storage devices of each copy of the file object according to the partition which the file object is stored, a write request to the storage devices to store the copies of the file object to the corresponding storage devices is initiated (step 150).

For example, the storage device corresponding to the replica through the distributed hash table is the device 1, 4 and 7. Then the replica may be written to the corresponding storage devices.

After the write operation, each storage device calculates a new hash value of the partition and transmits the new hash value to an adjacent storage device (step 160). Each storage device only actively synchronizes with the next neighboring device in the ring. The exchange of information with the upstream device is carried out in a passive manner, initiated by the upstream device.

Since a new file is written in the partition, the process from step 210 to step 230 is executed again for the partition stored with the copy to calculate the hash value of the new partition and the hash value is transmitted to the next storage node in the ring for verification. Theoretically the different copies of the same partition and the hash values should be consistent. If the inconsistence occurs due to not timely write, the latest copy would be selected from all the copies of the partition to cover] all the other old content.

Further, the processing for the failure node of the present disclosure is described.

Referring to FIG. 3A, the scenario that the node 311 needs to perform a synchronous operation on a partition under the situation that a node is failure will be illustrated. In this embodiment, it is assumed that the node 312 in the system is faulty due to power outage, disconnection, or other reasons.

Based on the scalability considerations, a storage node cannot know whether the remote node 312 is in a fault. In the original system design, the storage node 311 will continue to request synchronization to the storage node 312, even if the correct return cannot be obtained. The request for a node 312 that has already been in failure increases both the synchronization time and the network traffic, all of which are unnecessary.

In the original system design, because each synchronization needs to send request to all other nodes, although the failure of the node will increase the synchronization time of other nodes and network traffic, the system is still able to provide services using the remaining nodes.

In the ring synchronization process of the disclosure, the file object needs to be transmitted in the ring for one round in order to achieve consistency in the entire system. Once a node fails, synchronization will be suspended in this failed node and cannot be propagated forward. Thus, the present disclosure has designed a mechanism for a node to select another available node to continue synchronization if a node does not receive a response from the next node for a long time. The ring synchronization process may economize the traffic. The reason why the prior art design does not use the ring synchronization is that the system is not operable when the node fails, and the present disclosure can further solve the problem.

Figure 4:
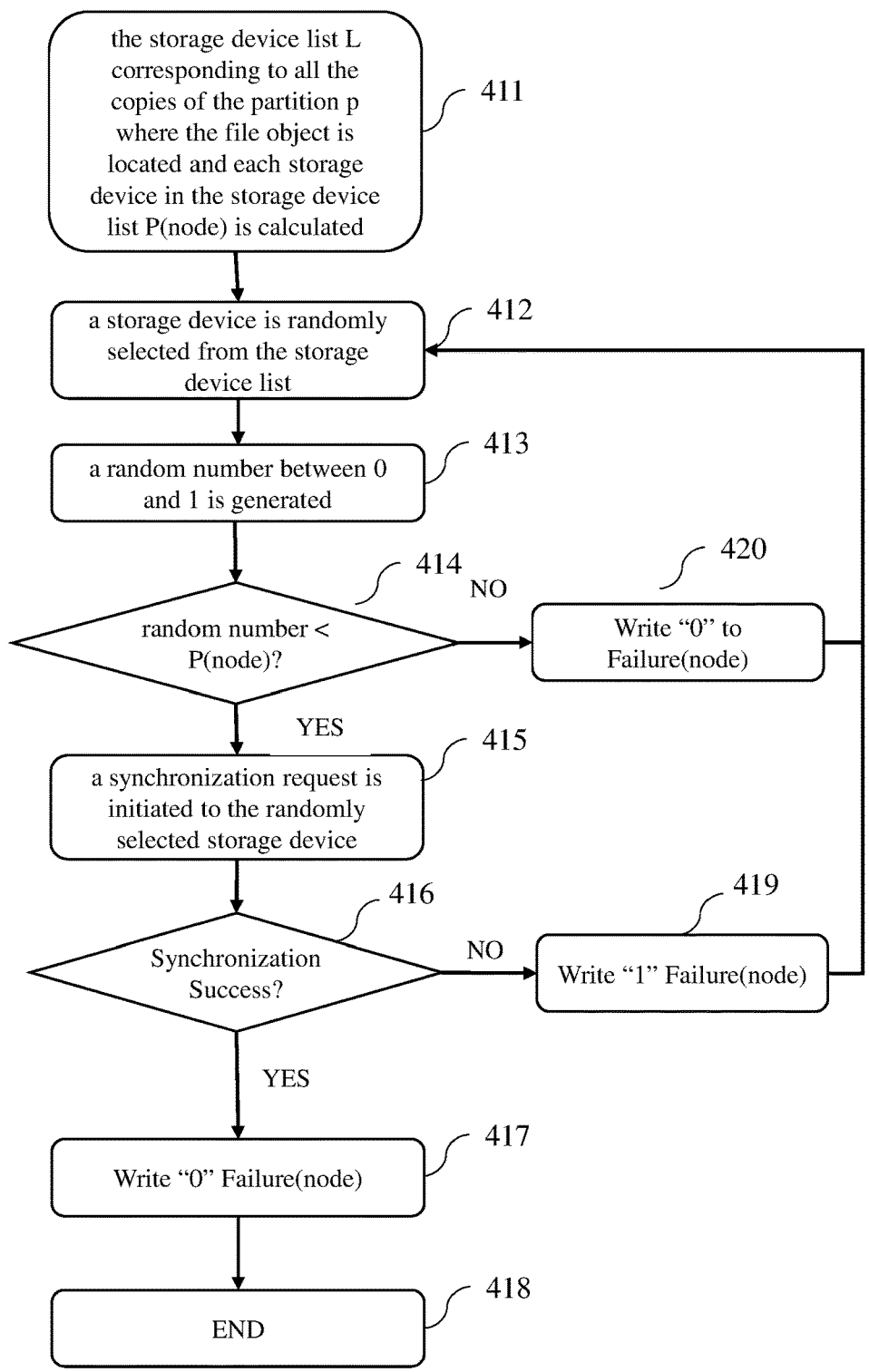
FIG. 4 illustrates the flow chart that a certain storage device selects a next synchronization device for a partition.

FIG. 4 illustrates the flow chart that a certain storage device selects a next synchronization device for a partition. In the step 150, if the copy of the file object cannot be written to the corresponding storage device after initiating a write request to the obtained storage devices, the step of FIG. 4 is performed.

Referring to FIG. 4, the storage device list L corresponding to all the copies of the partition p where the file object is located and each storage device in the storage device list P (node) is calculated (step 411). Further, a failure log table is used to record whether the last N synchronization request of each storage device fails, where 1 indicates a failure, and 0 indicates success. Next, a storage device is randomly selected from the storage device list L (step 412).

Then a random number between 0 and 1 (step 413) is generated and comparing the generated random number is compared with the randomly selected storage device P (node) (step 414).

P (Node) refers to the probability of selecting the storage device when synchronizing. For example, the calculated P (314) is the probability of selecting the storage device 314 in the next synchronization.

Then the method determines whether or not to request synchronization for the randomly selected storage device according to the comparison result between the random number and the selection probability of the randomly selected storage device. If the random number is less than the P (node) of the randomly selected storage device, a synchronization request is initiated to the randomly selected storage device (step 415). At this point the method determines whether the randomly selected storage device may normally respond to the synchronization request (step 416).

If it may normally respond to the synchronization request, "0" is written in the line in which the node is located in the failure log table (step 417), and then the synchronization ends (step 418). If it may not normally respond to the synchronization request, "1" is written in the line in which the node is located in the failure log table (step 417), and then selection of the storage device is repeated again (step 412).

Specifically, the success or failure times of the last N operations of each storage device is recorded in the failure log table. Failure (node) indicates the success or failure of the last N operations of the remote storage device by the current storage device (for example, the storage device 311). "1" represents failure, and "0" represents success. If the failure times of the last N operations exceeds a certain amount of times, the node can be considered as failure. The last N times a certain percentage of failure, you can think that the node failure. The following table is an example of N=5 maintained by the storage node 311.

| Failure Log Table (N = 5) | | | | | |
|---|---|---|---|---|---|
| 312 | 1 | 1 | 1 | 1 | 1 |
| 313 | 1 | 0 | 0 | 0 | 0 |
| 314 | 1 | 0 | 0 | 0 | 0 |
| 315 | 1 | 1 | 0 | 0 | 0 |

The formula for calculating the selection probability P (node) of the storage device according to this table is:

$$P(\text{node}) = \begin{cases} e^{-\epsilon * distance + Failure(node)}/\text{SUM}, & \text{if Failure(node)} < \alpha * N \\ 1/\text{device\_count}, & \text{otherwise} \end{cases}$$

wherein:

$\text{SUM} = \Sigma_{node} e^{-\epsilon * distance + Failure(node)}$. "node" herein indicates that the storage device that is not failure.

"Distance" is the logical distance of the remote storage device from the current storage device in the logical configuration of the current partition. Assuming that the logical structure of the five devices in this example is shown in FIG. 3B, taking the storage devices 311 as an example, the value of "distance" of the storage devices 312, 313, 314, 315 is 1, 2, 3, and 4 respectively. In this example, the number of the devices device_count=5, and take $\alpha=1$ and $\epsilon=0.5$. These two parameters may be adjusted according to the deployment of the system environment.

Since the last five operations of the storage device 311 on the storage device 312 are failed, exceeding N*0.5=2.5, the node 312 is considered to be failed. And the node 313, 314, and 315 is valid. Therefore, $\text{SUM}=e^{-2+1}+e^{-3+1}+e^{-4+2}=(2e^{-2}+e^{-1})$. Consequently, $$P(312) = 1/5, \ P(313) = e/(2+e), \ P(314) = P(315) = \frac{e^{-2}}{\text{SUM}} = 1/(2+e).$$

It can be seen that it is more likely for the system to select node 313 as the next synchronized node.

If the node 313 is selected for synchronization and the synchronization is successful, then the line where the 313 is left is shifted by one bit and 0 is written to the line where the node 313 is located. The new table is as follows:

| Failure Log Table (N = 5) | | | | | |
|---|---|---|---|---|---|
| 312 | 1 | 1 | 1 | 1 | 1 |
| 313 | 0 | 0 | 0 | 0 | 0 |
| 314 | 1 | 0 | 0 | 0 | 0 |
| 315 | 1 | 1 | 0 | 0 | 0 |

The scheme tends to select the valid nodes that is logically neighboring with more failure times because these nodes have a greater probability of being in an unsynchronized state. Synchronizing with these nodes as early as possible can reduce the flow of outdated data in the system to further reduce synchronization delay and network overhead. At the same time, the scheme detects the failure node according to the probability, so that the data can be recovered quickly after the re-access of the system.

Figure 6:
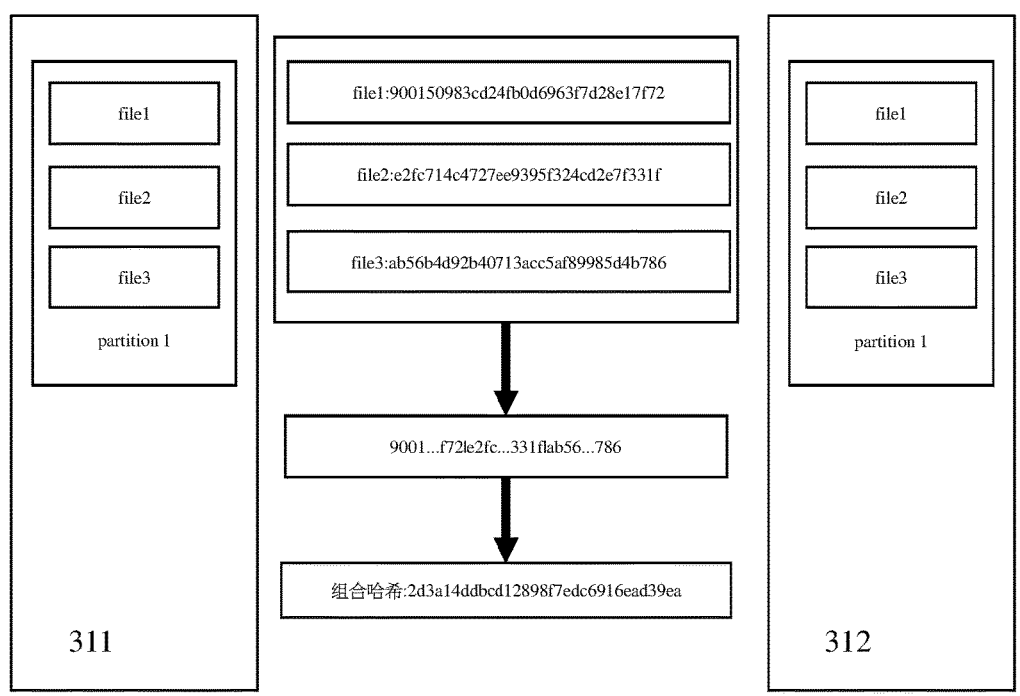
FIG. 6 illustrates the step of verification of the disclosure.

The steps for performing the verification are described in detail as below, with reference to FIG. 6.

Take the two storage devices as an example. The storage device 311 has three file objects, and the storage device 312 also has three file objects. First, the hash value of each file in the partition is calculated (step 210). Three hash values are obtained for the three file objects, and then the combined hash values are generated from the three hash values (step 220). After the new hash value is generated, the new hash value is transmitted to the storage device 312.

In the prior art, the combined hash value is transmitted to the storage device 312 after the step 220. Therefore, assuming that there are n files in a partition, the hash value is 32 bits. The prior art needs to transmit 32*n characters, and by the method disclosed in this disclosure, only 32 characters is required to be transmitted because a new hash value is generated.

Figure 7:
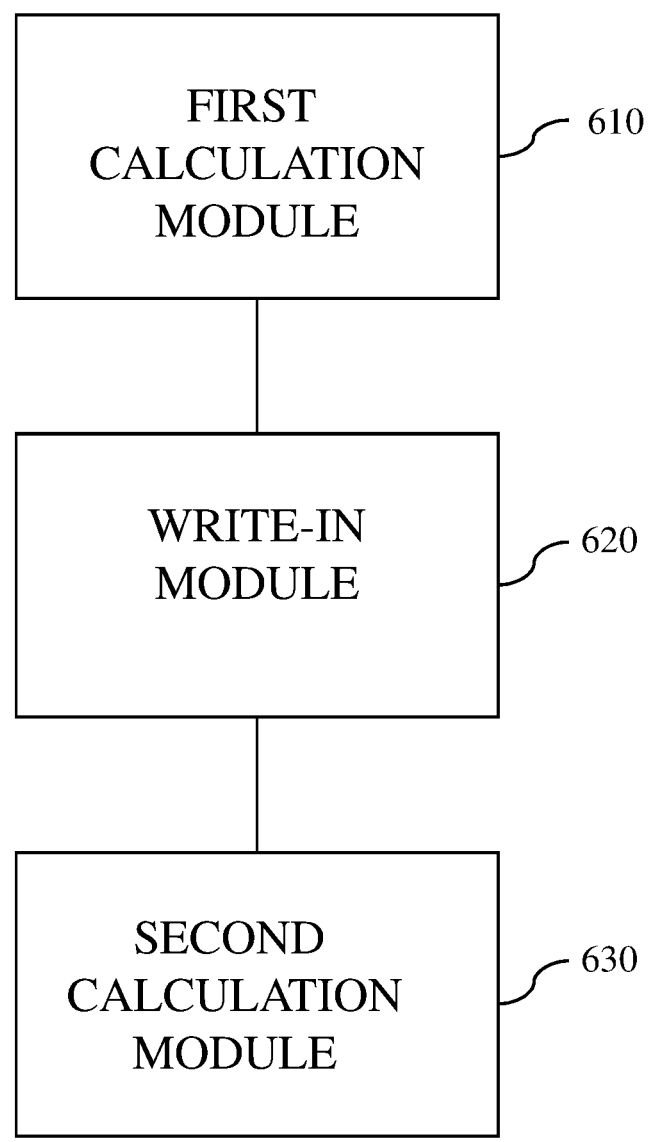
FIG. 7 is the schematic diagram of the synchronization device of the cloud storage system of the disclosure.

FIG. 7 is the schematic diagram of the synchronization device of the cloud storage system of the disclosure. The device includes a first calculation module 610, a write-in module 620 and a second calculation module 630. In response to an operation request for a file object initiated by a client, the first calculation module 610 calculates a hash value corresponding to the file object according to the operation request and acquires the partition which the file object is stored according to the calculated hash value. The write-in module 620 determines storage devices of each copy of the file object according to the partition which the file object is stored, and initiating a write request to the determined storage devices to store the copies of the file object to the corresponding storage devices. The second calculation module 630 calculates a new hash value and transmitting the new hash value to an adjacent storage device.

In another embodiment, the second calculation module 630 further calculates the hash value of each file in the partition, generates a combined hash value according to the hash value of each file and generates a new hash according to the combined hash value.

In another embodiment, if the write-in module 620 cannot write the copy of the file object into the corresponding storage device, the write-in module 620 further:

acquiring a storage device list corresponding to all the copies of the partition where the file object is located and the selection probability of each storage device in the storage device list;

randomly selecting one storage device from the storage device list;

generating a random number between 0 and 1;

comparing the random number and the selection probability of the randomly selected storage device; and determining whether or not to request synchronization for the randomly selected storage device according to the comparison result between the random number and the selection probability of the randomly selected storage device.

The above steps can be described with reference to the method described above and will not be repeated herein.

Figure 8:
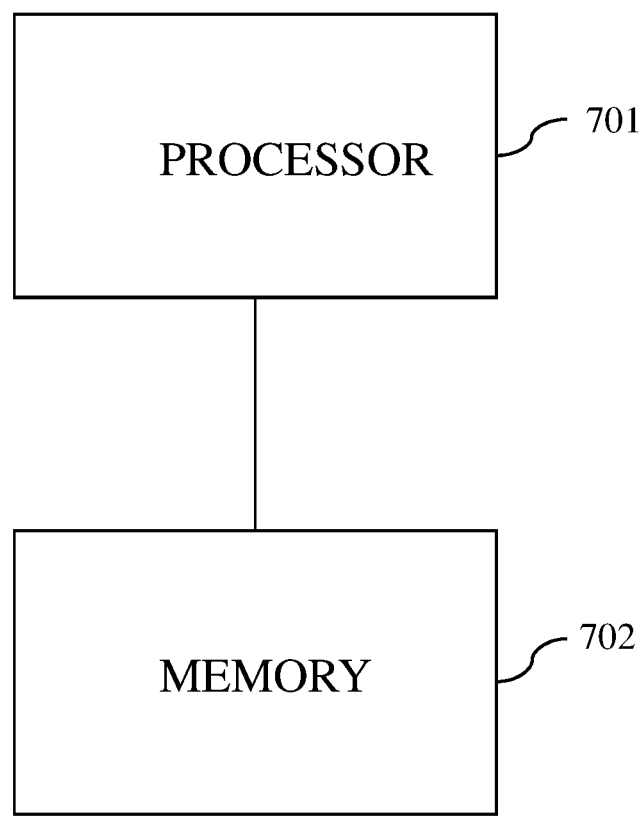
FIG. 8 is another schematic diagram of the synchronization device of the cloud storage system of the disclosure.

FIG. 8 is another schematic diagram of the synchronization device of the cloud storage system of the disclosure. The synchronization device includes one or more processor 701 and a memory 702. In FIG. 8, a processor 701 is taken as an example. The processor 701 and the memory 702 may be connected via a bus or other means.

The memory 702 functions as a non-transient computer readable storage medium for storing non-transient software programs, non-transient computer executable programs, and modules, such as program instructions/modules corresponding to the control methods in the embodiments of the present disclosure. The processor 701 executes the various functional applications of the server and the data processing by running the non-transient software programs, instructions and modules stored in the memory 702, i.e., the synchronization method disclosed in the above-described method embodiment.

The memory 702 may include a program storing area and a data storing area, wherein the program storing area may store an operating system, and at least one application program required for the function; the data storing area may store data created according to the use of the synchronization device. In addition, the memory 702 may include a high speed random access memory, and may also include non-transient memory, such as at least one disk storage device, a flash memory device, or another non-transient solid state memory device. In some embodiments, the memory 702 may optionally include a memory that is remotely provided with respect to the processor 701, which may be connected to the synchronization device via a network. Examples of such networks include, but are not limited to, Internet, the intranet, the local area network, the mobile communication network, and combinations thereof.

The one or more modules are stored in the memory 702, and when executed by the one or more processors 701, the synchronization method in any of the above-described method embodiments is executed.

The above-described product can execute the method provided by the embodiment of the present disclosure, and has the corresponding functional modules and the beneficial effects of the execution method. The details not described in detail in this embodiment can be found in the method provided by the embodiments of the present disclosure.

Accordingly, embodiments of the present disclosure also provide a computer-readable storage medium in which a program for executing the method of the above embodiment is stored.

For the technical effect of the synchronization method of the cloud storage system of the disclosure, please refer to the simulation results of FIGS. 9 to 16.

The data is simulated using five Dell PowerEdge T620 tower servers, each with: (1) two 8-core Intel Xeon processors, each with a core frequency of 2 GHz, (2) 32 GB of 1600 MHz DDR3 memory, (3) eight 600 GB 15K-RPM SAS disks, (4) two 1-Gbps Broadcom Ethernet Interface. The five servers form a local area network through a TP-Link Gigabit switch. The five servers are used as storage nodes in Openstack Swift, where one server acts as a proxy for processing client requests and for the authentication service Keystone. The physical architecture is the same as FIG. 3A.

The software operating system is: Ubuntu Server 14.04 64-bit. The client is the ssbench software installed on the ordinary PC. It is a test software for testing OpenStack Swift performance, which may send a series of commands to the system such as creation, deletion, modification, or read.

The simulation method monitors the messages (the message is located in the /var/log/syslog file) that the node starts a round of synchronization and monitors the messages (the message is located in the /var/log/syslog file) that the node sends a round of synchronization. Finally, the traffic of the Ethernet interfaces between the two messages and the time are calculated.

The simulation results in FIGS. 9 to 16 illustrate the case where the number of copies stored in the object storage system is set to 3, that is, each data is saved in three storage devices. There are three identical data in the system, and FIGS. 9 to 16 illustrate the network traffic and time required for a single device to synchronize all of its own partitions with other devices in four scenarios. In particular, the smallest unit of synchronization is the partition, and the partition contains a plurality of file objects, but a synchronous operation is for a whole partition, not for a separate object. The following "one round of synchronization process" refers to a synchronous operation for all the partitions in a single storage device. "A partition on a synchronous operation" refers to synchronize with the other storage device that stores the copy of the partition. In these figures, the dotted line bar graph is the prior art, and the black bar graph is the use of the synchronization method of the disclosure.

Figure 9:
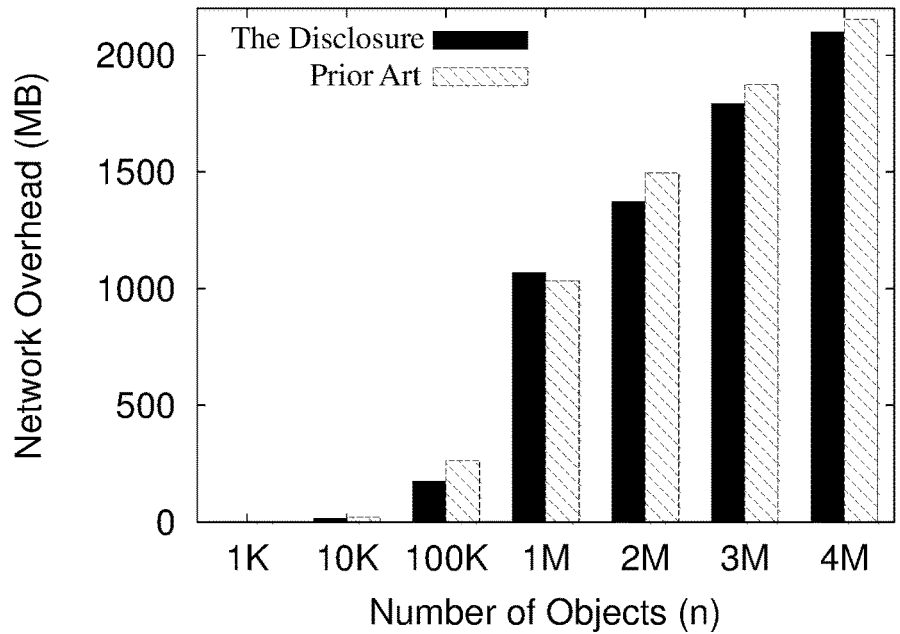
FIG. 9 is the simulation of the synchronization method of the disclosure.
Figure 10:
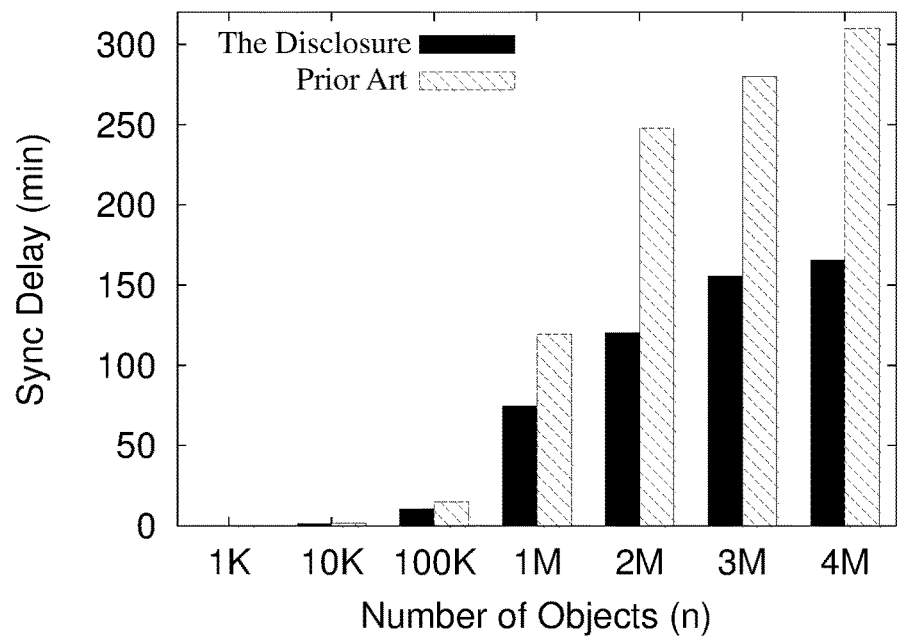
FIG. 10 is the simulation of the synchronization method of the disclosure.

FIG. 9 and FIG. 10 are the scenarios for the node failure.

When the system is running smoothly, one of the storage devices is disabled (shut down or disconnect the network, the device is set to be node 0), and the client issues a modification instruction to the system to modify one tenth of objects in the system (for example if there are 4 M (that is, 4 million) objects in the current system, then modify the 0.4 M objects). After modification, node 0 is reconnected to the system. At this time node 0 needs to synchronize with other storage devices to obtain the latest version of the object data. The traffic of the network traffic for node 0 to complete a round of synchronization is illustrated in FIG. 9, and the time required is illustrated in FIG. 10.

As can be seen from the data of FIG. 9 and FIG. 10, compared with the prior art, the network overhead using the synchronization method of the disclosure is relatively low, regardless of the number of file objects.

Figure 11:
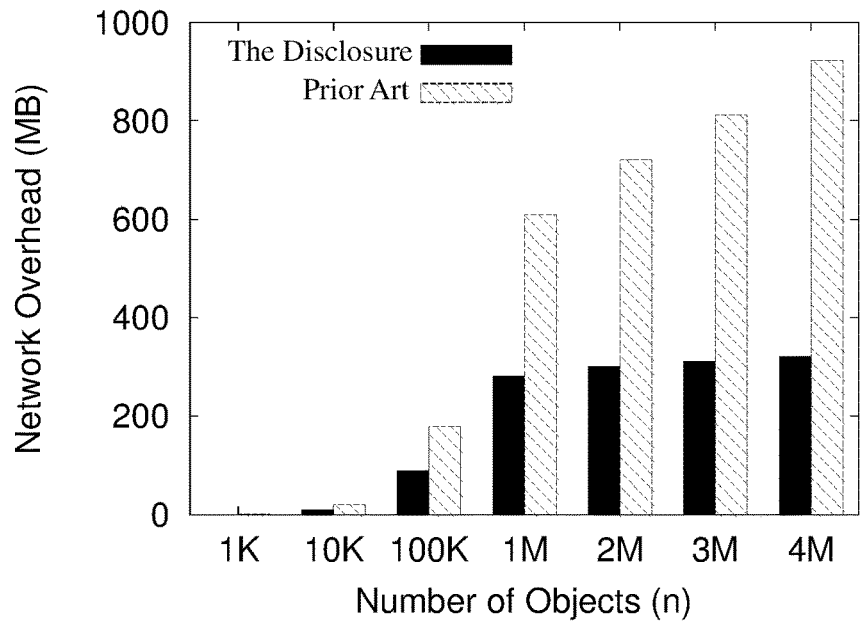
FIG. 11 is the simulation of the synchronization method of the disclosure.
Figure 12:
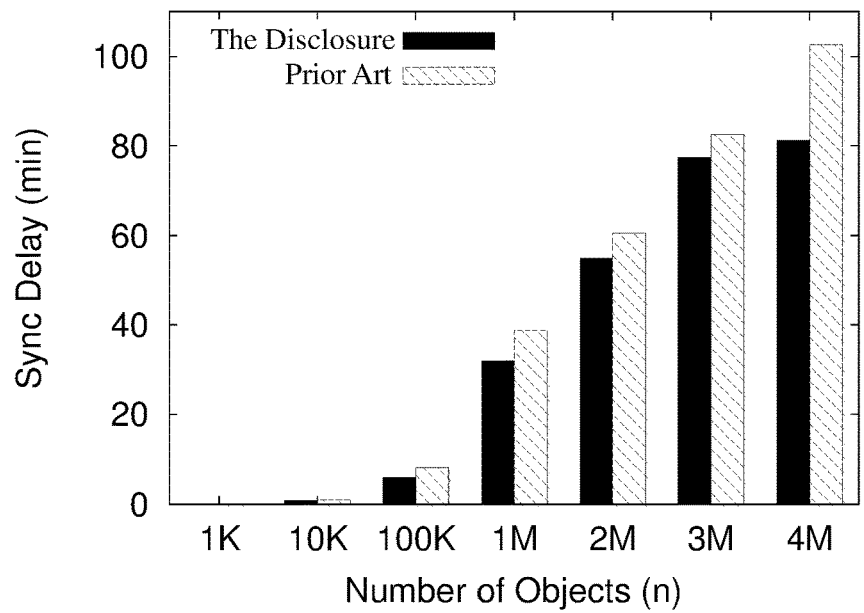
FIG. 12 is the simulation of the synchronization method of the disclosure.

FIG. 11 and FIG. 12 are the scenarios that 10% data is deleted.

When the system is running smoothly, the client sends a modification instruction to the system to delete 10% of the objects. After the deletion is complete, the network traffic generated by one of the storage devices to complete the synchronization is illustrated in FIG. 11. The time required is illustrated in FIG. 12.

Figure 13:
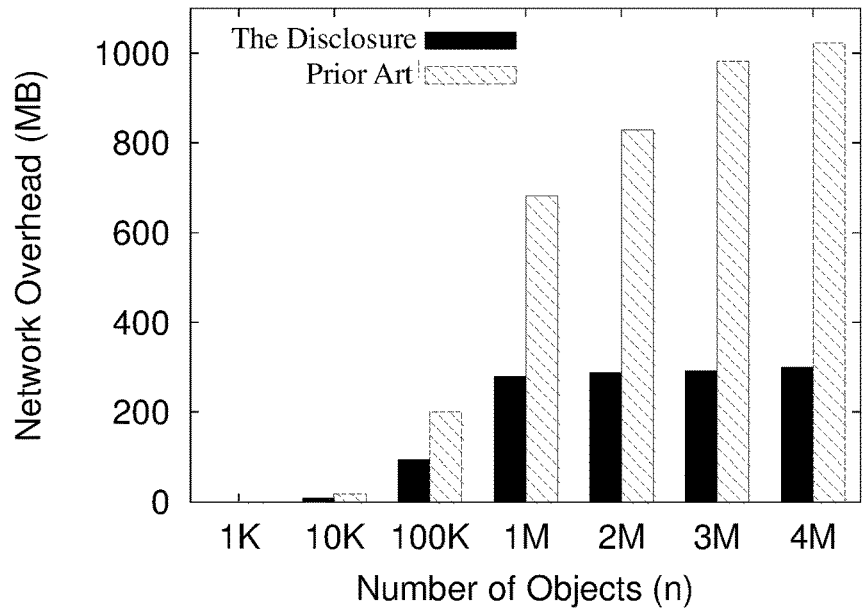
FIG. 13 is the simulation of the synchronization method of the disclosure.
Figure 14:
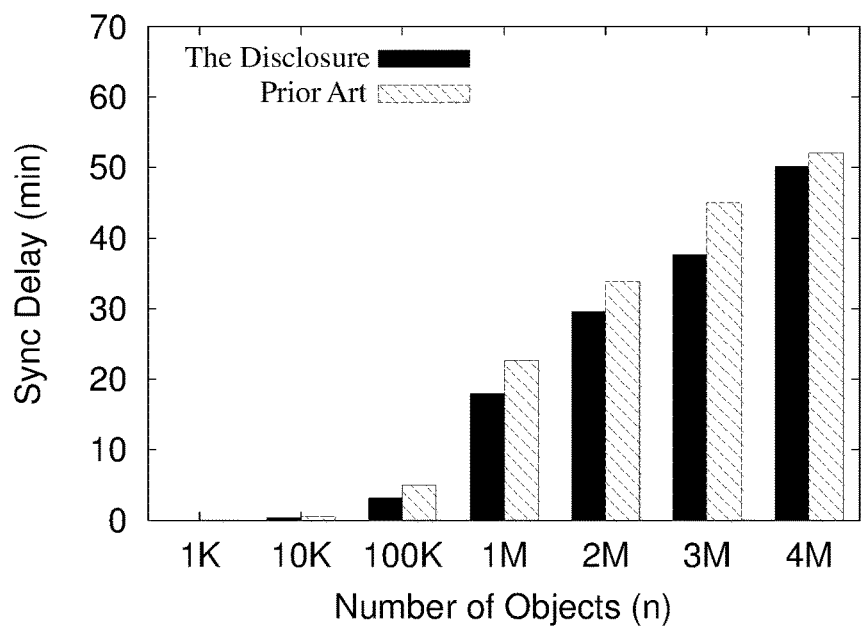
FIG. 14 is the simulation of the synchronization method of the disclosure.

FIG. 13 and FIG. 14 are the scenarios that 10% data is created.

When the system is running smoothly, the client issues a modification instruction to the system to create new objects equivalent to 10% of the current objects. For example, there are 4 M current objects and there will be 4.4 M objects after the creation is complete. After the creation is complete, the network traffic for a storage device to complete a round of synchronization is illustrated in FIG. 13. The time required is illustrated in FIG. 14.

Figure 15:
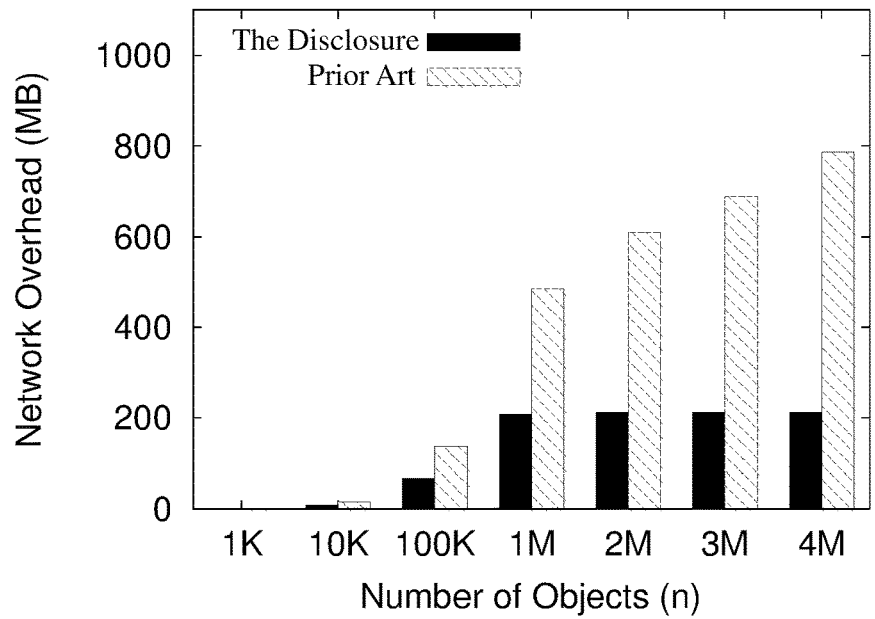
FIG. 15 is the simulation of the synchronization method of the disclosure.
Figure 16:
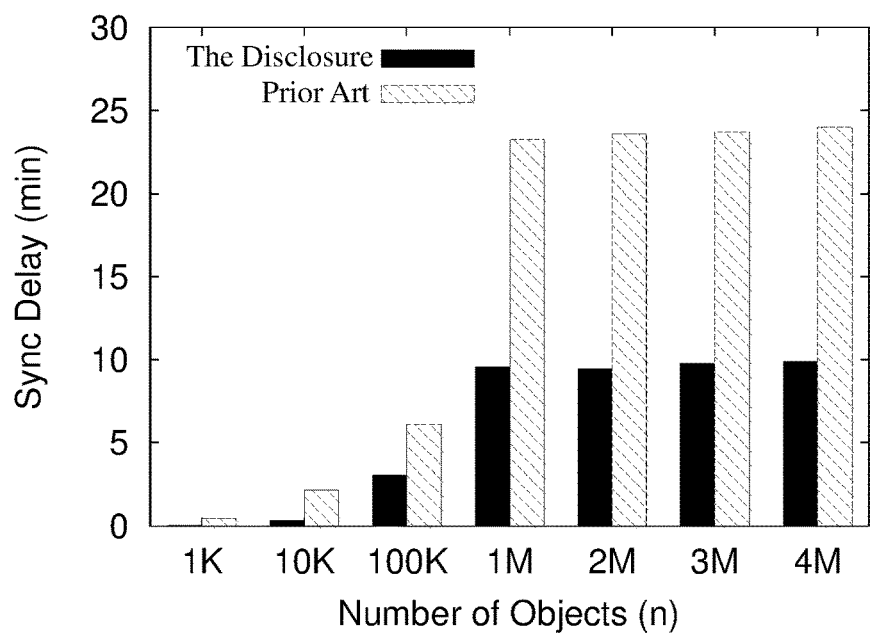
FIG. 16 is the simulation of the synchronization method of the disclosure.

FIG. 15 and FIG. 16 are the scenarios that the system operate normally.

In the scenarios of FIG. 15 and FIG. 16, the system is in the normal operation state, that is the addition, deletion, modification and so on of the files are not reached the scale of 10%. The system is in a relatively stable state. At this point, the network traffic for a storage device to complete a round of synchronization is illustrated in FIG. 15. The time required is illustrated in FIG. 16.

The method of the disclosure can be applied to four scenarios: creation, frequent deletion, node failure, and steady state. In these four scenarios, the method of the disclosure achieves more performance improvements compared with the existing methods. With the method of the present disclosure, the storage system may have a maximum storage capacity of more than four million files, equivalent to a medium capacity object storage system. From the simulated data, the method of the present disclosure can reduce the resources of the synchronous operation, and the network overhead at the time of calculation can be reduced.

The various embodiments in the present disclosure are generally described in a progressive manner, each of which is mainly described in terms of the differences from the other embodiments, and the same or similar parts between the various embodiments may be referred to each other. It is to be noted that, if not conflicting, the various features of the embodiments of the present disclosure and the embodiments may be combined with each other within the scope of the present disclosure. In addition, the steps shown in the flowcharts of the figures may be performed in a computer system such as a set of computer-executable instructions, and although the logical sequence is shown in the flowchart, in some cases, the steps may not need to be executed according to the steps as shown or described.

In this context, the relational terms such as "first" and "second" are used only to distinguish an entity or an operation from another entity or operation without necessarily requiring or implying that an actual relationship or order exists for such entity or operation. The terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

The program modules or units described above may be implemented by software, hardware, or a combination of both. The present disclosure may be applied in a distributed computing environment in which the tasks are executed by the remote devices connecting via a communication network. In a distributed computing environment, program modules or units may be located in local and remote computer storage media, including storage devices.

The device embodiments described above are only exemplary, wherein the units illustrated as separation parts may either be or not physically separated, and the parts displayed by units may either be or not physical units, i.e., the parts may either be located in the same plate, or be distributed on a plurality of network units. A part or all of the modules may be selected according to an actual requirement to achieve the objectives of the solutions in the embodiments. Those having ordinary skills in the art may understand and implement without going through creative work.

Through the above description of the implementation manners, those skilled in the art may clearly understand that each implementation manner may be achieved in a manner of combining software and a necessary common hardware platform, and certainly may also be achieved by hardware. Based on such understanding, the foregoing technical solutions essentially, or the part contributing to the prior art may be implemented in the form of a software product. The computer software product may be stored in a storage medium such as a ROM/RAM, a diskette, an optical disk or the like, and includes several instructions for instructing a computer device (which may be a personal computer, a server, or a network device so on) to execute the method according to each embodiment or some parts of the embodiments.

It should be finally noted that the above embodiments are only configured to explain the technical solutions of the present application, but are not intended to limit the present application. Although the present application has been illustrated in detail according to the foregoing embodiments, those having ordinary skills in the art should understand that modifications can still be made to the technical solutions recited in various embodiments described above, or equivalent substitutions can still be made to a part of technical features thereof, and these modifications or substitutions will not make the essence of the corresponding technical solutions depart from the spirit and scope of the technical solutions of each embodiment of the present application.

What is claimed is:

1. A synchronization method for a cloud storage system, comprising:
   receiving an operation request for a file object initiated by a client;
   calculating a hash value corresponding to the file object according to the operation request;
   acquiring the partition which the file object is stored according to the hash value;
   acquiring corresponding storage devices of each copy of the file object according to the partition which the file object is stored;
   initiating a write request to the storage devices to store the copies of the file object to the corresponding storage devices; and
   calculating a new hash value of the partition and transmitting the new hash value to an adjacent storage device;
   wherein if the copy of the file object cannot be written to the corresponding storage device after initiating a write request to the obtained storage devices, the method comprises:
   acquiring a storage device list corresponding to all the copies of the partition where the file object is located and the selection probability of each storage device in the storage device list;
   randomly selecting one storage device from the storage device list;
   generating a random number between 0 and 1;
   comparing the random number and the selection probability of the randomly selected storage device; and
   determining whether or not to request synchronization from the randomly selected storage device according to the comparison result between the random number and the selection probability of the randomly selected storage device.

2. The synchronization method according to claim 1, wherein the step of calculating a new hash value of the partition comprises:
   calculating the hash value of each file in the partition;
   generating a combined hash value according to the hash value of each file; and
   generating a new hash according to the combined hash value.

3. A synchronization device for a cloud storage system, comprising:
   a first calculation module, in response to an operation request for a file object initiated by a client, calculating a hash value corresponding to the file object according to the operation request and acquiring the partition which the file object is stored according to the calculated hash value;
   a write-in module determining storage devices of each copy of the file object according to the partition which the file object is stored, and initiating a write request to the determined storage devices to store the copies of the file object to the corresponding storage devices; and
   a second calculation module calculating a new hash value of the partition and transmitting the new hash value to an adjacent storage device;
   wherein if the write-in module cannot write the copy of the file object to the corresponding storage device after initiating a write request to the obtained storage devices, wherein if the write-in module further;
   acquiring a storage device list corresponding to all the copies of the partition where the file object is located and the selection probability of each storage device in the storage device list;
   randomly selecting one storage device from the storage device list;
   generating a random number between 0 and 1;
   comparing the random number and the selection probability of the randomly selected storage device; and
   determining whether or not to request synchronization for the randomly selected storage device according to the comparison result between the random number and the selection probability of the randomly selected storage device.

4. The synchronization device according to claim 3, wherein the second calculation module further:
   calculating the hash value of each file in the partition;
   generating a combined hash value according to the hash value of each file; and
   generating a new hash according to the combined hash value.

5. A synchronization device for a cloud storage system, comprising:
   one or more processors and a memory;
   one or more modules stored in the processor, when the one or more modules are executed by the one or more processors, the one or more modules executes the steps of:

receiving an operation request for a file object initiated by a client;

calculating a hash value corresponding to the file object according to the operation request;

acquiring the partition which the file object is stored according to the hash value;

acquiring corresponding storage devices of each copy of the file object according to the partition which the file object is stored;

initiating a write request to the storage devices to store the copies of the file object to the corresponding storage devices; and calculating a new hash value of the partition and transmitting the new hash value to an adjacent storage device;

wherein if the copy of the file object cannot be written to the corresponding storage device after initiating a write request to the obtained storage devices, the one or more modules further executes the steps of:

acquiring a storage device list corresponding to all the copies of the partition where the file object is located and the selection probability of each storage device in the storage device list;

randomly selecting one storage device from the storage device list;

generating a random number between 0 and 1;

comparing the random number and the selection probability of the randomly selected storage device; and determining whether or not to request synchronization for the randomly selected storage device according to the comparison result between the random number and the selection probability of the randomly selected storage device.

6. The synchronization device according to claim 5, wherein when the one or more modules are executed by the one or more processors, the one or more modules further executes the steps of:

calculating the hash value of each file in the partition;

generating a combined hash value according to the hash value of each file; and generating a new hash according to the combined hash value.

* * * * *